United States Patent
Freshour

(10) Patent No.: US 11,648,869 B2
(45) Date of Patent: May 16, 2023

(54) PICKUP CAMPER

(71) Applicant: William R. Freshour, Brighton, CO (US)

(72) Inventor: William R. Freshour, Brighton, CO (US)

(*) Notice: Subject to any disclaimer, the term of this patent is extended or adjusted under 35 U.S.C. 154(b) by 77 days.

(21) Appl. No.: 17/491,696

(22) Filed: Oct. 1, 2021

(65) Prior Publication Data

US 2023/0103642 A1   Apr. 6, 2023

(51) Int. Cl.
*B60P 3/34* (2006.01)

(52) U.S. Cl.
CPC ...................... *B60P 3/34* (2013.01)

(58) Field of Classification Search
CPC ....................................... B60P 3/34
See application file for complete search history.

(56) References Cited

U.S. PATENT DOCUMENTS

| | | | |
|---|---|---|---|
| 3,411,819 A | 11/1968 | Donald | |
| 3,603,330 A * | 9/1971 | Halldorson | B60P 3/38 135/148 |
| 3,690,719 A | 9/1972 | Yount | |
| 3,953,066 A | 4/1976 | Hamilton | |
| 5,213,390 A | 5/1993 | Borchers | |
| 5,335,960 A | 8/1994 | Benignu | |
| 5,924,761 A | 7/1999 | Harrison | |
| 5,951,095 A | 9/1999 | Herndon | |
| 5,957,525 A | 9/1999 | Nelson | |
| 6,030,026 A | 2/2000 | Vega | |
| 6,663,167 B2 | 12/2003 | Phillips | |
| 6,840,569 B1 * | 1/2005 | Leigh | B60P 3/34 296/26.06 |
| 7,942,464 B2 | 5/2011 | Schmidt | |
| 10,086,684 B1 * | 10/2018 | Stamm, Jr. | B60J 7/1621 |
| 10,596,951 B1 | 3/2020 | Williams | |
| 10,829,028 B2 * | 11/2020 | Delgadillo, Jr. | B60J 7/1657 |
| 11,130,437 B1 * | 9/2021 | Tatro | B60P 3/39 |
| 2002/0163221 A1 | 11/2002 | Smith | |
| 2009/0179455 A1 | 7/2009 | Ogden | |
| 2012/0248817 A1 | 10/2012 | Miller | |
| 2019/0225135 A1 | 7/2019 | Dorn | |
| 2020/0392722 A1 | 12/2020 | Chinn | |
| 2021/0122285 A1 | 4/2021 | Brown | |

* cited by examiner

*Primary Examiner* — Joseph D. Pape
(74) *Attorney, Agent, or Firm* — Leyendecker & Lemire, LLC

(57) ABSTRACT

A pickup camper is described. Embodiments of the pickup camper can include, but are not limited to, a camper body and a roof assembly. The camper body can include a front panel, a left-side panel, a right-side panel, a cross-member, and a back panel. The roof assembly can include a panel rotatably and removably coupled to the left-side panel, a panel rotatably and removably coupled to the right-side panel, a panel rotatably and removably coupled to the cross-member, and a roof panel rotatably and removably coupled to the front panel. In a travel configuration, the roof assembly components can be folded down on one another with the roof panel covering the other panels. In a deployed configuration, the roof assembly components can be rotated upwards to increase an overhead height inside the pickup camper.

19 Claims, 9 Drawing Sheets

PICKUP CAMPER

BACKGROUND

Various different pop-up campers for trucks are currently available. Most currently available pop-up campers include a rigid body and a pop-out manufactured from a pliable material. The pop-out is provided to create more space in an interior of the pop-up camper, mainly head room. However, such pop-outs manufactured from pliable materials do not offer the ability to have any weight placed on them. This can limit the types of accessories that are designed to be placed on top of vehicles.

A rigid, lightweight pop-out included with a pickup camper is needed.

DETAILED DESCRIPTION

Figure 1A:
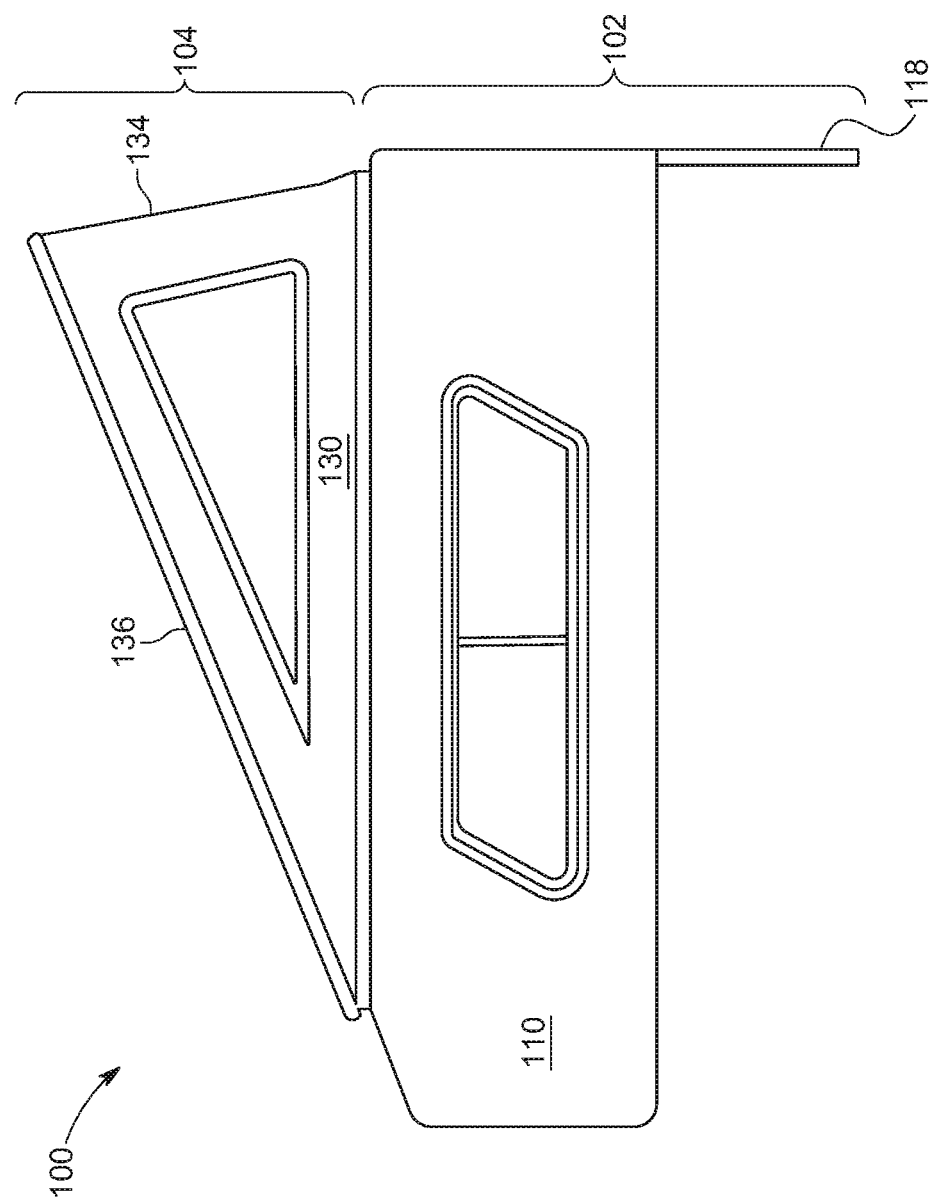
FIG. 1A is a left, side view of a pickup camper according to one embodiment of the present invention.

Embodiments of the present invention include a camper for a pickup truck that can be configured to disassemble into several substantially flat panels. Generally, the camper can include, but is not limited to, a camper body and a roof assembly. The camper body can be removably coupled to a truck bed and the roof assembly can be removably coupled to the camper body.

The camper can be configured in a first (or travel) configuration and a second (or deployed) configuration. In the travel configuration, components of the roof assembly can be lowered such that the roof assembly is substantially flat on top of the camper body. In the deployed configuration, the roof assembly can be rotated upwards and components can be raised to provide additional space above a top of the camper body. The roof assembly can include a plurality of panels that can be removably coupled to the camper body and one another. The plurality of panels can be configured to move between the travel configuration and the deployed configuration.

In one embodiment, the camper body can include, but is not limited to, a right-side panel, a left-side panel, a front panel, a back header (or cross-member), and a back panel. Each of the components of the camper body can be removably coupled to an adjacent panel/header and/or a bed of a truck. Typically, the left-side panel and the right-side panel can each be coupled to the front panel and to the back header. The back panel can be rotatably coupled to the back header. For instance, the back panel can include a door and the entire back panel (door included) can be adapted to rotate approximately 90 degrees from vertical to substantially horizontal. When the components of the camper body are assembled, the roof assembly can be secured to the camper body.

The roof assembly can typically include a roof panel, a left panel, a right panel, and a back panel. In the travel configuration, the right panel, the left panel, and the back panel can be folded down and the roof can be folded down to cover each of the components and an interior of the camper body. The right panel, the left panel, and the back panel can be located in an interior of the camper body when in the retracted configuration. In the deployed configuration, the roof can be rotated upwards at an angle while the left panel, the right panel, and then the back panel can be rotated up to support the roof panel and provide a slanted roof with additional headspace in the camper body.

In a typical implementation, components of the camper body can be assembled on a truck bed. Front ends of the right-side panel and the left-side panel can be coupled to either end of the front panel. The header can be coupled between the back ends of the left-side panel and the right-side panel. The back panel can then be attached to the header. After the camper body has been constructed, components of the roof assembly can be coupled to the camper body one-by-one. In one instance, the roof panel can be coupled to the front panel of the camper body via one or more hinges. The hinged connection can allow a back end of the roof panel to rotate upwards to provide more head space. The left panel can be rotatably coupled to the left-side panel of the camper body. In one instance, one or more "J" shaped members can be implemented to removably couple the left panel and the right panel of the roof assembly to the respective side panels of the camper body. The "J" shaped members can allow for the roof assembly panels to be attached to a corresponding member on a camper body side panel and then rotated upwards. After the left panel and the right panel of the roof assembly are attached, the back panel can be coupled to the back header of the camper body. In some instances, the camper body can include protrusions (or plates) extending out from tops of the side panels such that the back panel can interface with and rest on the protrusions.

As can be appreciated, the protrusions can be implemented to keep the back panel from rotating down into the camper body once secured in place.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

An Embodiment of a Pickup Camper

Figure 1C:
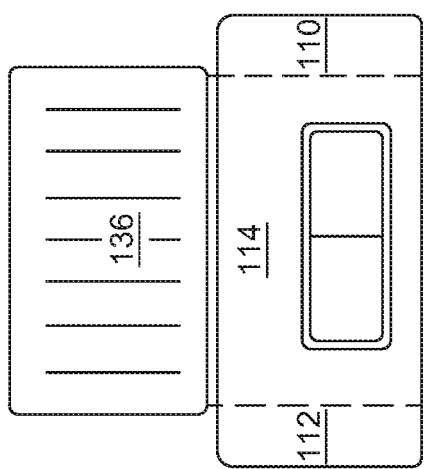
FIG. 1C is a front view of a pickup camper according to one embodiment of the present invention.
Figure 1E:
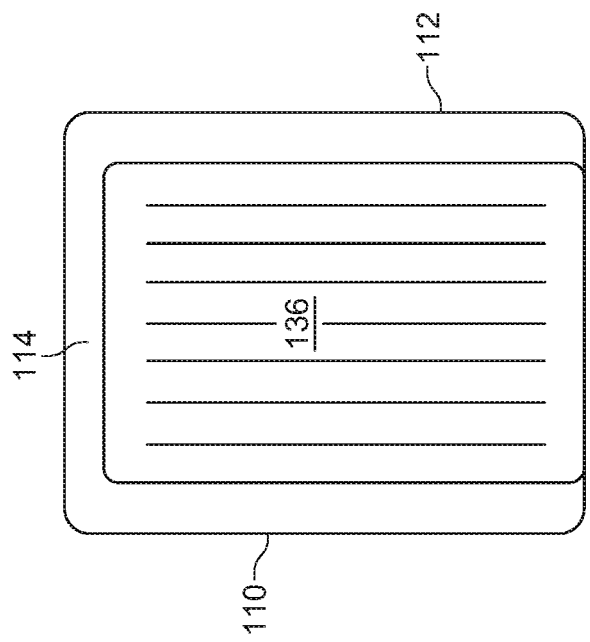
FIG. 1E is a top view of a pickup camper according to one embodiment of the present invention.
Figure 1B:
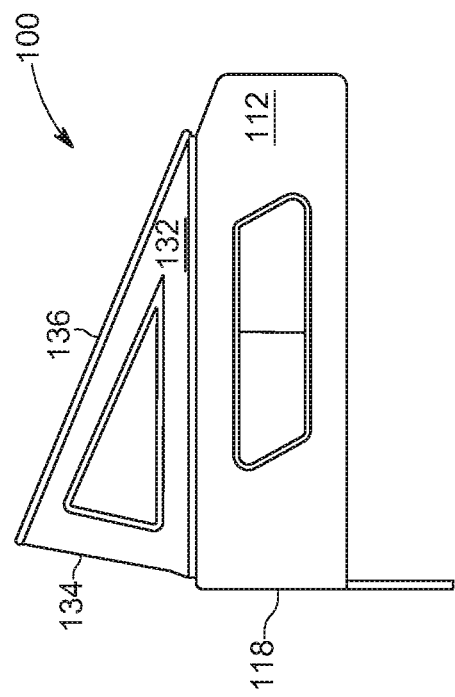
FIG. 1B is a right, side view of a pickup camper according to one embodiment of the present invention.
Figure 1D:
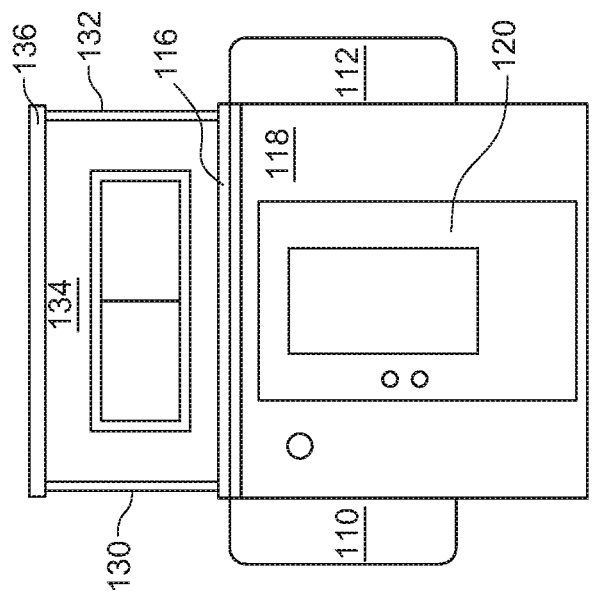
FIG. 1D is a back view of a pickup camper according to one embodiment of the present invention.

Referring to FIGS. 1A-1E, detailed diagrams of an embodiment 100 of a pickup camper is illustrated. The pickup camper 100 can implement a plurality of panels configured to be assembled together and disassembled as needed. FIG. 1A is a left, side view of the pickup camper. FIG. 1B is a right, side view of the pickup camper. FIG. 1C is a front view of the pickup camper. FIG. 1D is a back view of the pickup camper. FIG. 1E is a top view of the pickup camper. FIGS. 1A-1E can show the pickup camper 100 in a deployed configuration. Of note, the pickup camper 100 is shown with components having windows included. It is to be appreciated that various different sizes and designs for windows are contemplated and not outside a scope of the present invention.

In one embodiment, as shown generally in FIGS. 1A-1B, the pickup camper 100 can include, but is not limited to, a camper body 102 and a roof assembly 104. Components of the roof assembly 104 can be rotatably and removably coupled to components of the camper body 102. In some instances, the entire pickup camper 100 can be disassembled into the various components for storage when not in use.

The camper body 102 can include, but is not limited to, a first side-panel 110, a second side-panel 112, a front panel 114, a back header (or cross-member) 116, and a back panel 118. The first side-panel 110 can be a left-side panel and the second side-panel 112 can be a right-side panel. The back panel 118 can include a door 120. The camper body components 110-118 can typically be made from a rigid material. In one instance, the components 110-118 can be made from a laminate including a first layer of rigid material, a second layer of insulating material, and a third layer of rigid material. For example, a first layer of fiberglass, a second layer of insulating foam, and a third layer of fiberglass.

In a typical implementation, the camper body 102 components can be configured to removably couple to one another to form the camper body 102. The components 110-118 can be coupled to form a substantially rectangular box that can be removably coupled to a truck bed. The front panel 114 can be removably coupled to the left-side panel 110 and the right-side panel 112. As shown, the front panel 114 can be located between the left-side panel 110 and the right-side panel 112. The back header 116, similar to the front panel 114, can be removably coupled to the left-side panel 110 and the right-side panel 112 and located between either panel. In one instance, a plurality of fasteners can be implemented to mate the various components together. Typically, weather stripping can be provided where to different components mate together to help ensure a water tight seal between components. As will be shown, the camper body components 110-116 can include flanges that are configured to mate with a flange of another component.

The roof assembly 104 can include, but is not limited to, a left panel 130, a right panel 132, a back panel 134, and a roof panel 136. The roof assembly 104 can generally be configured in either a travel configuration or a deployed configuration. In the travel configuration, the left panel 130, the right panel 132, the back panel 134, and the roof panel 136 can each be oriented substantially horizontal. In the deployed configuration, the left panel 130, the right panel 132, the back panel 134, and the roof panel 136 can each be oriented substantially vertical. The left panel 130, the right panel 132, and the back panel 134 can support the roof panel 136 when in the deployed configuration. As shown in FIGS. 1A-1B, the roof assembly 104 can be implemented to increase an overhead space in the pickup camper 100. Of note, similar to the camper body 102, the components 130-136 of the roof assembly 104 can be rigid. In one example, the components 130-136 can be manufactured from a rigid laminate including a first layer of fiberglass, a second layer of insulating foam, and a third layer of fiberglass. It is to be appreciated that other materials are contemplated that can provide rigidity and insulation for the components.

To move from the travel configuration to the deployed configuration, the roof panel 136 can be rotated from the substantially horizontal position upwards to an approximately 45-degree angle position and the left panel 130, the right panel 132, and the back panel 134 can each be rotated from the substantially horizontal position to a substantially vertical position.

Figure 2B:
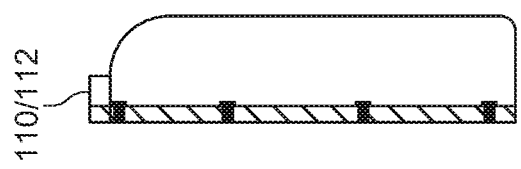
FIG. 2B is a front view of a side panel of a camper body according to one embodiment of the present invention.
Figure 2A:
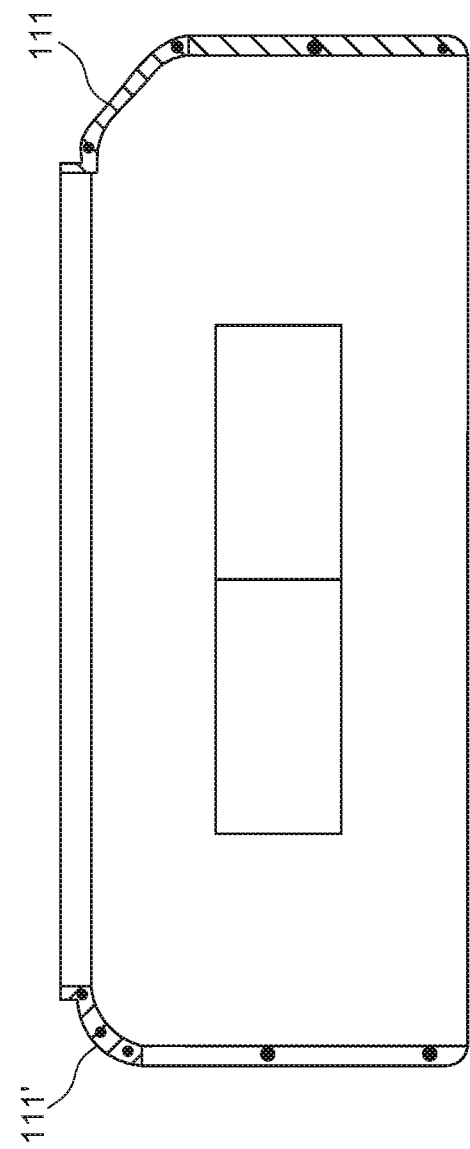
FIG. 2A is a side view of a side panel of a camper body according to one embodiment of the present invention.
Figure 2C:
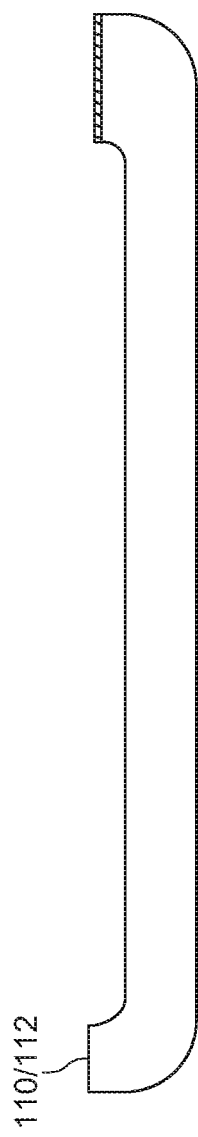
FIG. 2C is a top view of a side panel of a camper body according to one embodiment of the present invention.

Referring to FIGS. 2A-2C, various views of one embodiment of the camper body left-side panel 110 are illustrated. FIG. 2A includes a side view of the camper body left-side panel 110. FIG. 2B includes a front view of the camper body left-side panel 110. FIG. 2C includes a top view of the camper body left-side panel 110. Of note, the camper body right-side panel 112 can be substantially similar to the left-side panel 110, but a mirror image of the camper body left-side panel 110. As such, only a side, top, and front view of the camper body left-side panel 110 are provided.

As shown in FIG. 2A, the camper body left-side panel 110 can have a substantially rectangular shape. The left-side panel 110 can include a first flange 111 configured to mate with a flange of the front panel 114 and a second flange 111' configured to mate with a flange of the back header 116. Typically, one or more fasteners can be implemented to couple the flanges together. For instance, a bolt and nut combination can be implemented. In another instance, clamps can be implemented to couple the flanges together. Of note, as the components of the camper body 102 are designed to be removably coupled together, the fastener implemented can be configured to be undone to facilitate coupling and uncoupling of the components.

Figure 5B:
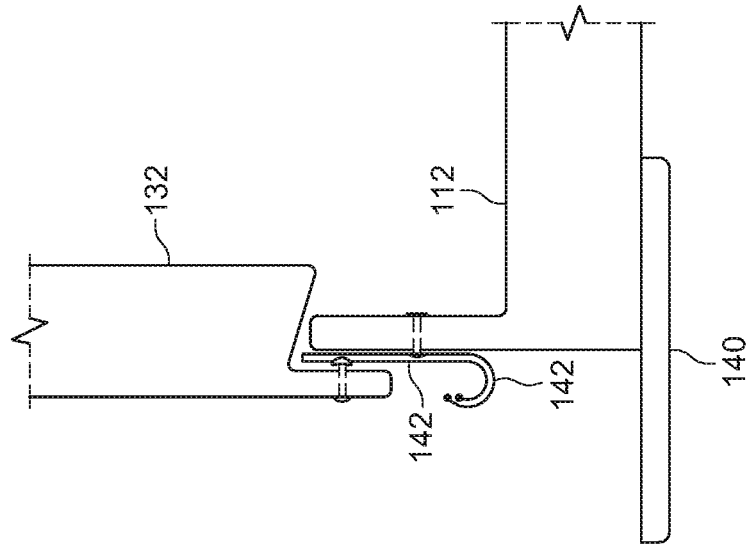
FIG. 5B is a close-up view of a roof assembly in a deployed configuration according to one embodiment of the present invention.
Figure 5A:
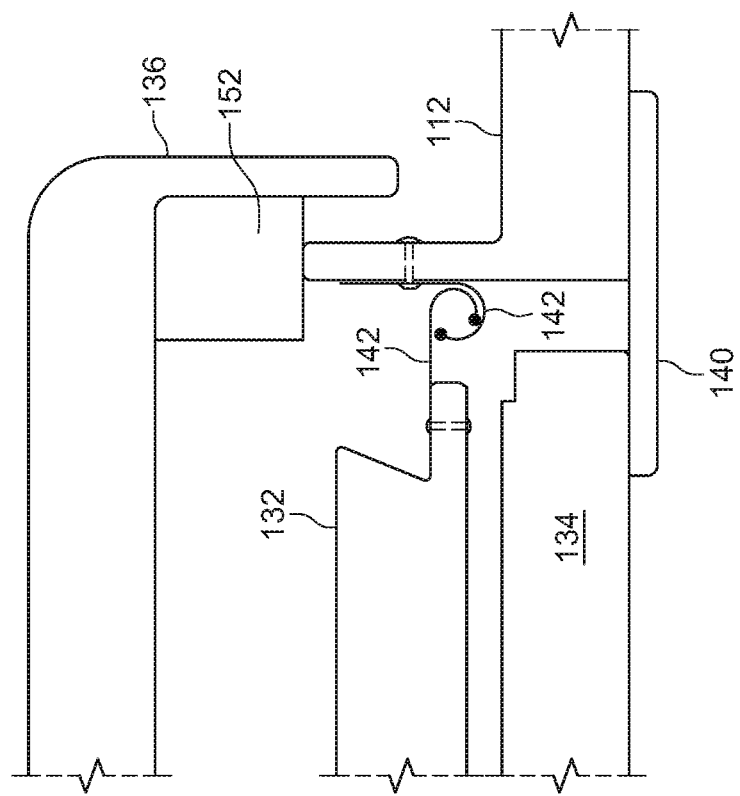
FIG. 5A is a close-up view of a roof assembly in a travel configuration according to one embodiment of the present invention.

As shown generally in FIGS. 2A-2B, a top section of the left-side panel 110 can include a protrusion 113 running along a length of the left-side panel 110. The protrusion (or lip) 113 can be implemented to mate with the panels of the roof assembly 104, as shown in FIGS. 5A-5B.

As shown in FIG. 2C, the left-side panel 110 can include a generally "U" shaped cross-section. As can be appreciated, this can allow for a bottom of the left-side panel 110 to interface with a sidewall of a truck bed and provide minimum interference with a usable square footage of the truck bed.

Figure 3B:
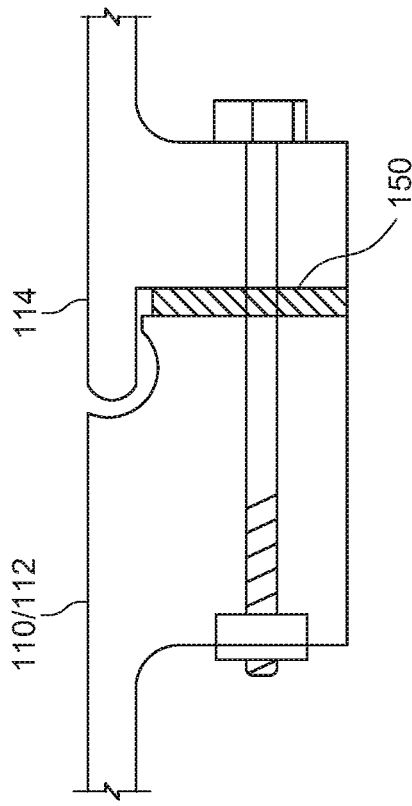
FIG. 3B is a side view of a front panel according to one embodiment of the present invention.
Figure 3A:
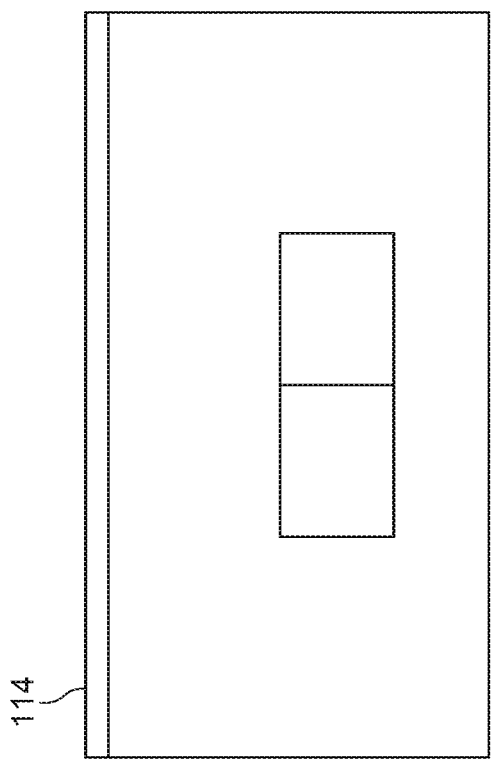
FIG. 3A is front view of a front panel according to one embodiment of the present invention.
Figure 3C:
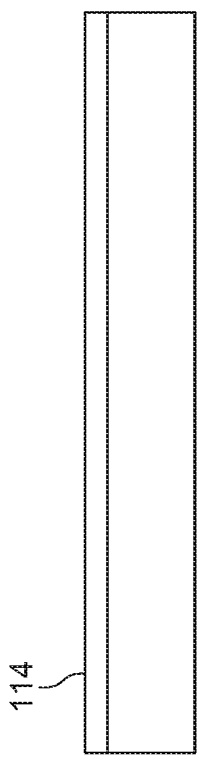
FIG. 3C is a top view of a front panel according to one embodiment of the present invention.

Referring to FIGS. 3A-3C, various views of one embodiment of the camper body front panel 114 are illustrated. As previously mentioned, the front panel 114 can be configured to be located between the left-side panel 110 and the right-side panel 112.

As shown in FIG. 3A, the front panel 114 can include a flange 115 on each end of the panel. The flanges 115 can be configured to mate with and couple to the flanges 111, 111' of the left-side panel 110 and the right-side panel 112. Similar to the side panels 110/112, the front panel 114 can include a protrusion (or lip) along a top of the front panel 114 to interface with the roof panel 136 of the roof assembly 104.

Figure 4:
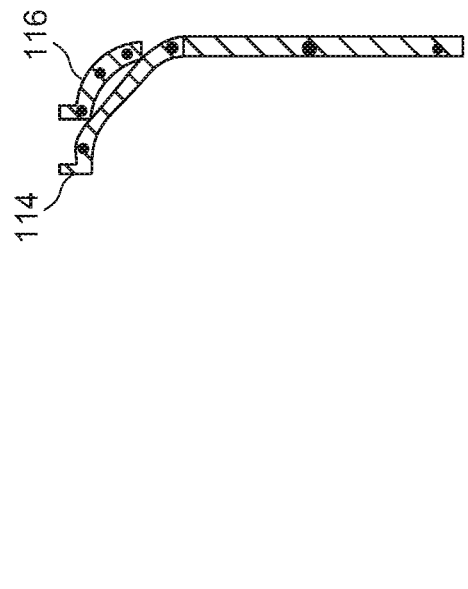
FIG. 4 is a close-up view of an interface of a side panel and a front panel according to one embodiment of the present invention.

Referring to FIG. 4, a close-up view of a coupling between the camper body front panel 114 and one of the camper body side panels 110/112 is illustrated. More specifically, a coupling of the flange 111 with the flange 115 is shown. Typically, the flanges 111, 115 can be designed to provide a watertight seal between the components. As shown, the flange 115 of the front panel 114 can over pass the flange 111 of the left-side panel 110. Weather stripping 150 or similar materials can be implemented along a length of the coupling between the front panel 114 and the side panels 110, 112 to provide a waterproof barrier to exterior elements. As shown, a bolt and nut combination can be implemented to couple the flanges together. As previously mentioned, other means of securing the components of the camper body 102 together are contemplated and not outside a scope of the present disclosure.

Referring to FIGS. 5A-5B, close-up views of an interaction between components of the camper body 102 and the roof assembly 104 are illustrated. FIG. 5A includes a close-up view of the pickup camper 100 in a travel configuration. FIG. 5B includes a close-up view of the pickup camper 100 in a deployed configuration.

In one example, to removably couple the side panels 130, 132 of the roof assembly 104 to the side panels 110, 112 of the camper body 102, one or more substantially "J" shaped members 142 can be implemented. The substantially "J" shaped members 142 can allow for the roof assembly side panels 130. 132 to removably, and rotatably, couple to substantially "J" shaped member secured to the camper body side panels 110, 112. As generally shown in FIGS. 5A-5B, the substantially "J" shaped member 142 of the roof assembly 104 can be sized to fit within the substantially "J" shaped member 142 of the camper body 102.

In the travel configuration, as shown in FIG. 5A, each of the roof assembly 104 components can be rotated down to be substantially horizontal. Each of the camper body side panels 110, 112 can include a plate 140 for interfacing with the back panel 134 of the roof assembly 104. As shown in FIG. 5A, the substantially "J" shaped member 142 of the roof assembly components can interface with the substantially "J" shaped member 142 of the camper body components.

In one instance, the roof panel 136 can include a compressible member 152 for interfacing with the lip of the camper body side panels 110, 112. As can be appreciated, the compressible member 152 may run a length of the sides of the roof panel 136. The compressible member 152 can help create a weatherproof and tight (or snug) fit between components of the roof assembly 104 and the camper body 102. For example, latches can be implemented to couple the roof panel 136 to the respective components of the camper body 102. As the latches bring the roof panel 136 closer to the camper body 102, the compressible member 152 can engage and press back against the roof panel 136 and the camper body 102 to provide a snug fit between the components of the roof assembly 104 and the camper body 102. Although the compressible member 152 is shown with a square cross-section, other shapes are contemplated and not outside a scope of the present invention. In one example, the compressible member 152 can be a semi-rigid closed cell foam. In another example, the compressible member 152 can be rubber.

In the deployed configuration, as shown in FIG. 5B, each of the components of the roof assembly 104 can be rotated upwards to be substantially vertical. In one instance, the roof panel 136 can be rotated first and then the side panels 130, 132 can be rotated one after the other and then finally the back panel 134 can be rotated upwards. As shown in FIG. 5B, the right panel 132 can be rotated to a substantially vertical orientation with a lower section of the right panel 132 interfacing with the lip of the right-side panel 112. Of note, the lower section of the right panel 132 (and a lower section of the left panel 130) can include a notch proximate a bottom of the panel to provide an overhang of the lip of the right-side panel 112. As can be appreciated, this can help limit moisture entering into the camper body 102 when raining.

Figure 5C:
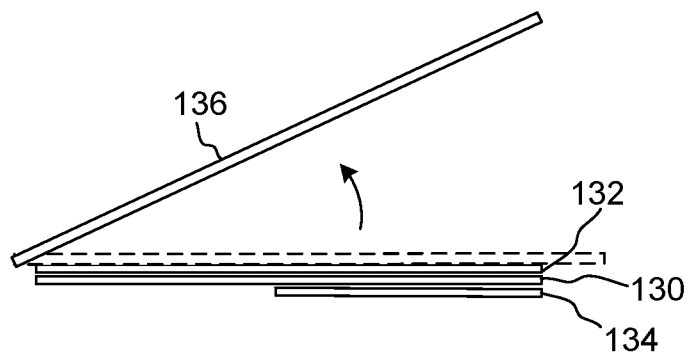
FIG. 5C is a side view of a roof assembly moving from a travel configuration to a deployed configuration according to one embodiment of the present invention.
Figure 5C:
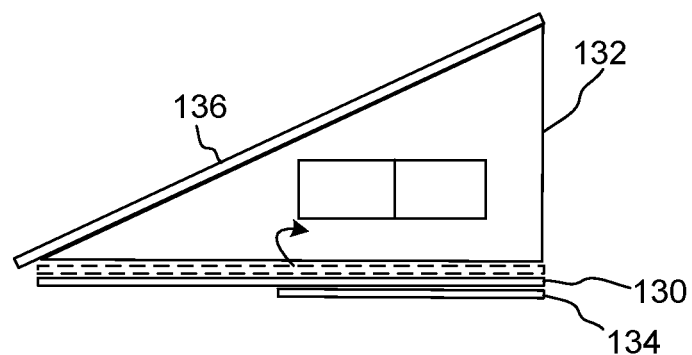
Figure 5C:
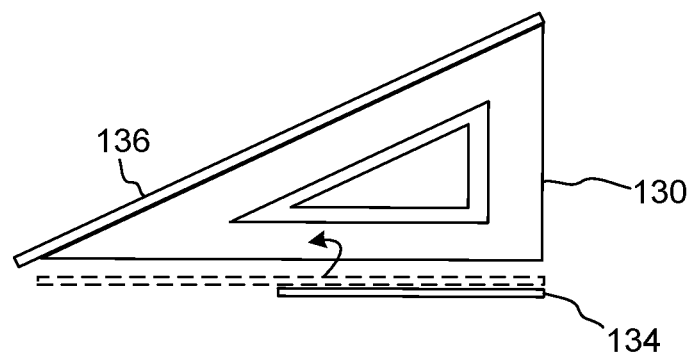
Figure 5C:
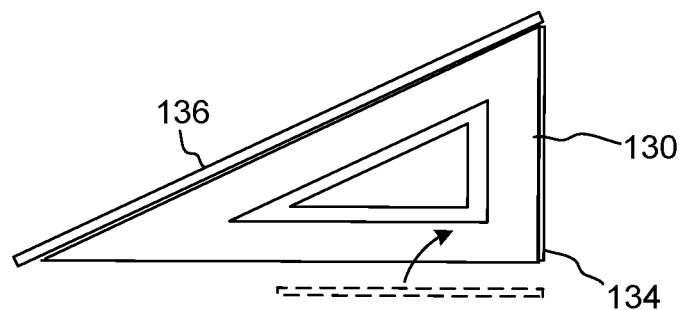

Referring to FIG. 5C, several diagrams from a side view of the components of the roof assembly 104 moving from the travel configuration to the deployed configuration are illustrated. As shown, the roof panel 136 can be rotated upwards to an approximately 45-degree angle. To support the roof panel 136, the right panel 132 can be rotated upwards to engage the roof panel 136. Next, the left panel 130 can be rotated upwards to interface with the roof panel 136. Finally, the back panel 134 can be rotated upwards to interface with the left panel 130, the right panel 132, and the roof panel 136. As can be appreciated, from the side view, the left panel 130 would be rotated up and out towards a viewer. The right panel 132 would be rotated up and away from a viewer. The left panel 130 and the right panel 134 include different shapes for windows that may be implemented.

Figure 6:
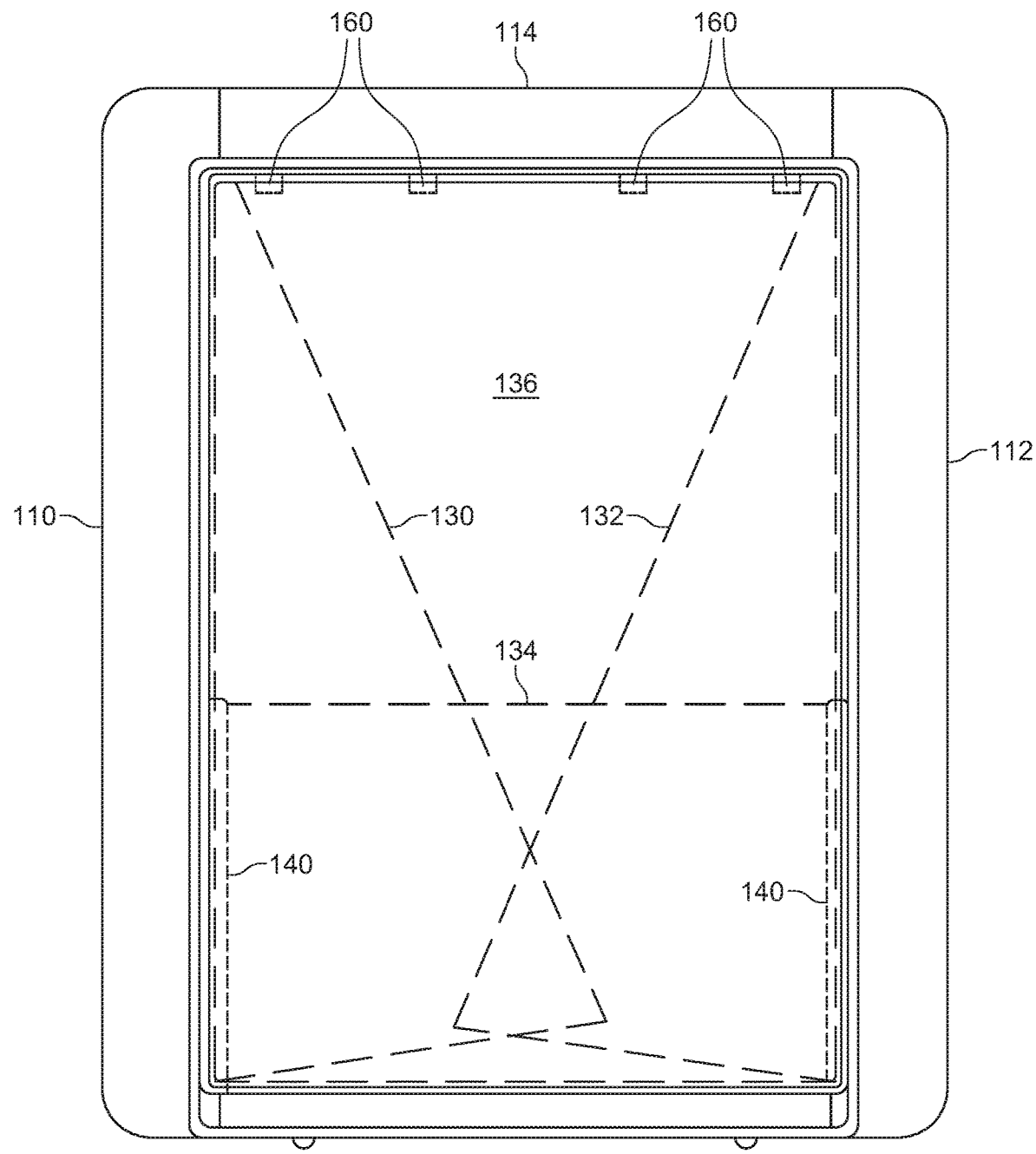
FIG. 6 is a top view of a pickup camper according to one embodiment of the present invention.

Referring to FIG. 6, a top view of the pickup camper 100 in the travel configuration is illustrated. Of note, the components of the roof assembly 104 can be substantially horizontal when in the travel configuration. As can be appreciated, the left panel 130, the right panel 132, and the back panel 134 can each be rotatably coupled to the respective component of the camper body 102. Generally, the back panel 134 of the roof assembly 104 can be rotated first and down to interact with the plates 140 of the camper body 102. The plates 140 can be implemented to engage the back panel 134 and support the panels 130, 132, 134 of the roof assembly 104. Once the back panel 104 has been rotated down, either one of the side panels 130, 132 can be rotated down and then the other after. Of note, the first rotated side panel 130, 132 can interface with the back panel 134. The panels 130, 132, 134 can be sized to fit between an upper surface of the plates 140 and the roof panel 136.

In one embodiment, a pickup camper can include a rigid left-side panel (the first side panel 110 and the left panel 130), a rigid right-side panel (the second side panel 112 and the right panel 132), a rigid back panel (the cross-member 116, the back panel 118, and the back panel 134), and a rigid front panel (the front panel 114 and the roof panel 136). The rigid left-side panel can have an upper section (the left panel 130) rotatably coupled to a lower section (the first side panel 110) where the upper section of the rigid left-side panel can be adapted to rotate from horizontal to substantially vertical. The rigid right-side panel can have an upper section (the right panel 132) rotatably coupled to a lower section (the second side panel 112) where the upper section of the rigid right-side panel can be adapted to rotate from horizontal to substantially vertical. The rigid back panel can have an upper section (the back panel 134) rotatably coupled to a middle section (the cross-member 116) where the upper section of the rigid back panel can be adapted to rotate from horizontal to substantially vertical. The rigid front panel can have an upper section (the roof panel 136) rotatably coupled to a lower section (the front panel 114) where the upper section (the roof panel 136) of the rigid front panel can be adapted to rotate from horizontal to an angle of approximately 45 degrees.

The upper section (the left panel 130) of the rigid left-side panel is removably coupled to the lower section (the first side panel 110) of the rigid left-side panel. The upper section (the right panel 132) of the rigid right-side panel is removably coupled to the lower section (the second side panel 112) of the rigid right-side panel. The upper section (the back panel 134) of the rigid back panel is removably coupled to the middle section (the cross-member 116) of the rigid back panel. The upper section (the roof panel 136) of the rigid front panel is removably coupled to the lower section (the front panel 114) of the rigid front panel.

In a travel configuration, the upper section (the left panel 130) of the rigid left-side panel is oriented substantially horizontal, the upper section (the right panel 132) of the rigid right-side panel is oriented substantially horizontal, the upper section (the back panel 134) of the rigid back panel is oriented substantially horizontal, and the upper section (the roof panel 136) of the rigid front panel is oriented substantially horizontal and covering the upper sections of the rigid left-side panel, the rigid right-side panel, and the rigid back panel.

In a deployed configuration, the upper section (the back panel 134) of the rigid back panel is oriented in a substantially vertical position, the upper section (the left panel 130) of the rigid left-side panel is oriented in a substantially vertical position, the upper section (the right panel 132) of the rigid right-side panel is oriented at a substantially vertical position, and the upper section (the roof panel 136) of the rigid front panel is oriented at approximately a 45-degree angle from horizontal. The upper section (the roof panel 136) of the rigid front panel can be interfacing with the rigid left-side panel, the rigid right-side panel, and the rigid back panel.

The upper section (the left panel 130) of the rigid left-side panel has a substantially triangular shape and the lower section (the first side panel 110) of the rigid left-side panel has a substantially rectangular shape. The upper section (the right panel 132) of the rigid right-side panel has a substantially triangular shape and the lower section (the second side panel 112) of the rigid right-side panel has a substantially rectangular shape.

The rigid back panel includes a lower section (the back panel 118) rotatably coupled to the middle section (the cross-member 116) where the lower section is adapted to rotate from vertical to horizontal.

Figure 7A:
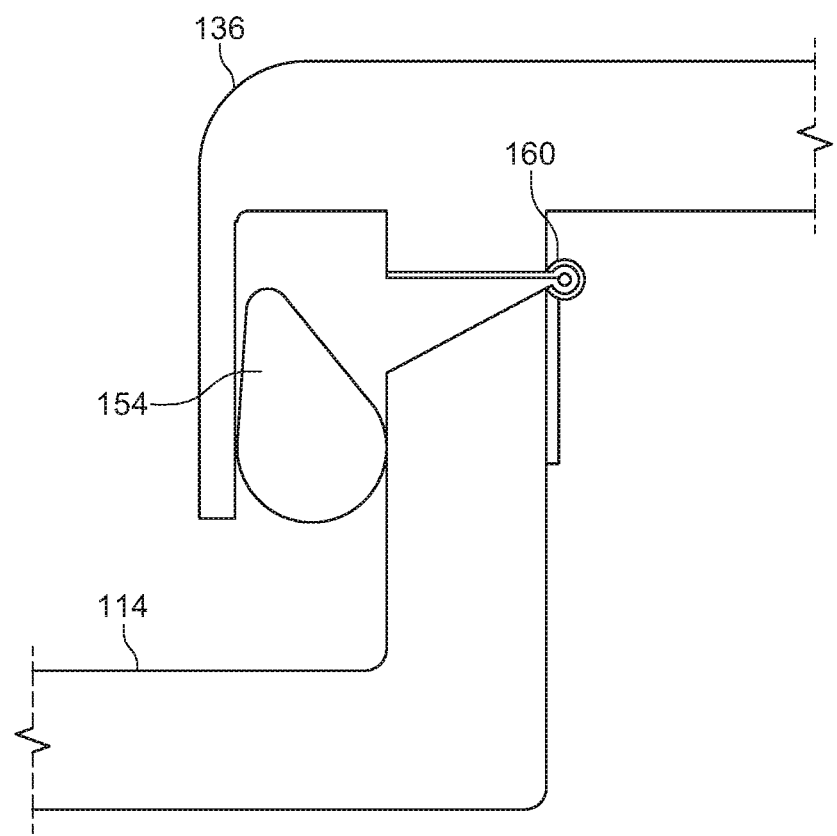
FIG. 7A is a close-up, side view of a roof panel according to one embodiment of the present invention.
Figure 7B:
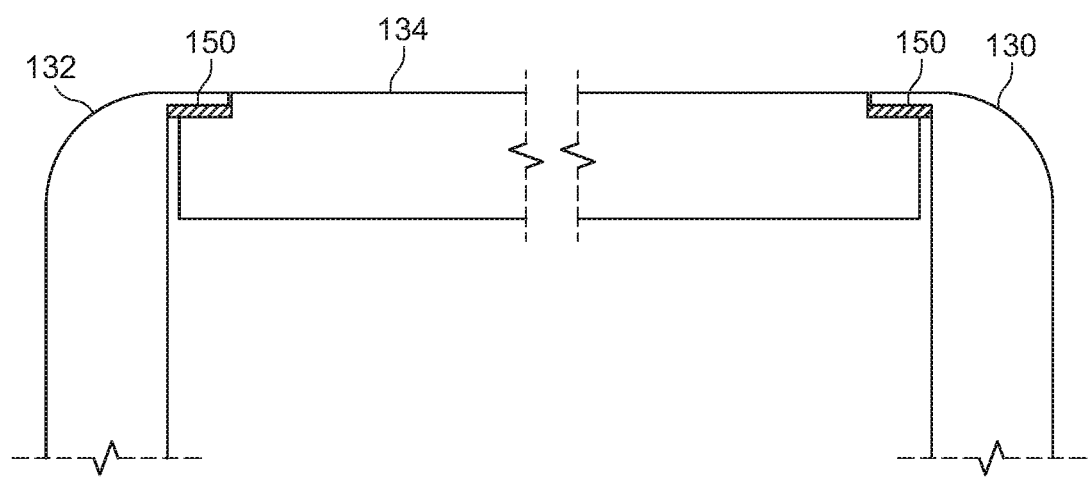
FIG. 7B is a top view of a roof assembly according to one embodiment of the present invention.

Referring to FIGS. 7A-7B, close-up views of components of the roof assembly 104 are illustrated. FIG. 7A includes a close-up view of the roof panel 136 interacting with the camper body front panel 114. FIG. 7B includes a close-up view of the side panels 130, 132 interfacing with the back panel 134.

Referring back to FIG. 6, one or more hinges 160 can be implemented to couple the roof panel 136 to the front panel 114 of the camper body 102. As shown in FIG. 7B, a first hinge leaf can connect to the roof panel 136 and a second hinge leaf can connect to an inside of the lip of the front panel 114. Although a leaf hinge is shown, it is to be appreciated that other types of hinges and rotatable couplings can be implemented.

A compressible member 154 can be implemented between the roof panel 136 and the front panel 114. As the roof panel 136 is rotated upwards, the compressible member 154 can engage and press back against the roof panel 136 and the front panel 114 to provide a snug fit between the components of the roof assembly 104. In one instance, the compressible member 154 can be an elongated piece of foam running a length of the lip of the front panel 114. In another instance, the compressible member 152 can be comprised of a plurality of pieces of semi-rigid material spaced along a length of the front panel 114. In one example, the compressible member 154 can be a semi-rigid closed cell foam. In another example, the compressible member 154 can be rubber.

Referring to FIG. 7B, a top view of the roof assembly side panels 130, 132 interacting with the back panel 134 is illustrated. Of note, weatherstripping 150 can be implemented between the components of the roof assembly 104 where they mate together. This can help with keeping moisture out of the pickup camper 100 along with providing a dampening effect when traveling between components.

In one example implementation, a disassembled pickup camper 100 can be assembled in the bed of a truck. First, components of the camper body 102 can be assembled on the truck bed. After the components of the camper body 102 are assembled, the roof assembly 104 components can be attached to the camper body 102.

In a first step of assembling the camper body 102, front ends of the right-side panel 112 and the left-side panel 110 can be coupled to either front end of the front panel 114. The header 116 can be coupled between back ends of the left-side panel 110 and the right-side panel 112. The back panel 118 can then be attached to the header 116. As previously mentioned, the back panel 118 may be rotatably coupled to the header 116. By rotatably coupling the back panel 118 to the header 116, the back panel 118 can be configured to rotated from substantially vertical to substantially horizontal to open up the pickup camper 100

After the camper body 102 has been assembled, components of the roof assembly 104 can be coupled to the camper body 102 one-by-one. In a first step, the roof panel 136 can be coupled to the front panel 114 of the camper body 104 via the one or more hinges 160. As can be appreciated, the hinged connection can allow a back end of the roof panel 136 to rotate upwards to provide more head space inside the pickup camper 100. After the roof panel 136 has been secured, the left panel 130 can be rotatably coupled to the left-side panel 110 of the camper body 102. Typically, the one or more "J" shaped members 142 can be implemented to removably couple the left panel 130 and the right panel 132 of the roof assembly 104 to the respective side panels 110, 112 of the camper body 102. The "J" shaped members 142 can allow for the roof assembly panels to be attached to a corresponding member on a camper body side panel and then rotated upwards. Of note, a user can "hang" the roof assembly panels 130, 132, 134 to the respective panels (and cross-member) of the camper body 102 and then rotate the roof assembly panels upwards. As can be appreciated, this can allow a single person to install and set-up the pickup camper 100. After the left panel 130 and the right panel 132 of the roof assembly 104 are in place, the back panel 134 can be coupled to the back header 116 of the camper body 102. In some instances, the camper body 102 can include the protrusions (or plates) 140 extending out from tops of the side panels 110, 112 such that the back panel 134 can interface with, and rest on, the protrusions 140. Typically, the back panel 134 can be slid up onto the protrusions 140 and then rotatably coupled to the back header 116. Of note, the back panel 134 can rest on the protrusions 140 while waiting to be rotatably coupled to the back header 116. Further, the protrusions 140 can be implemented to keep the back panel 134 from rotating down into the camper body 102 once secured in place.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A pickup camper comprising:
a camper body, the camper body including:
a front panel;
a cross-member;
a right-side panel, a first end of the right-side panel removably coupled to a right side of the front panel and a second end of the right-side panel removably coupled to a right side of the cross-member;
a left-side panel, a first end of the left-side panel removably coupled to a left side of the front panel and a second end of the left-side panel removably coupled to a left side of the cross-member; and
a back panel removably and rotatably coupled to the cross-member;
a roof assembly removably coupled to the camper body, the roof assembly including:
a rigid left-side panel rotatably and removably coupled to the camper body left-side panel;
a rigid right-side panel rotatably and removably coupled to the camper body right-side panel;
a rigid back panel rotatably and removably coupled to the camper body cross-member; and
a rigid roof panel removably and rotatably coupled to the camper body front panel.

2. The pickup camper of claim 1, wherein in a travel configuration:
the roof left-side panel is oriented substantially horizontal;
the roof right-side panel is oriented substantially horizontal;
the roof back panel is oriented substantially horizontal; and
the roof panel is oriented substantially horizontal.

3. The pickup camper of claim 2, wherein in a deployed configuration:
the roof panel is rotated from the substantially horizontal position to an approximately 45-degree angle position;
the roof back panel is rotated from the substantially horizontal position to a substantially vertical position;
the roof left-side panel is rotated from the substantially horizontal position to a substantially vertical position; and
the roof right-side panel is rotated from the substantially horizontal position to a substantially vertical position.

4. The pickup camper of claim 1, wherein the roof right-side panel and the roof left-side panel each have a substantially triangular shape.

5. The pickup camper of claim 4, wherein the roof back panel has a substantially rectangular shape.

6. The pickup camper of claim 1, wherein the camper body back panel pivots about a longitudinal axis of the cross-member.

7. The pickup camper of claim 1, wherein the camper body back panel includes a door.

8. The pickup camper of claim 1, wherein in a travel configuration:
the roof back panel is oriented substantially horizontal and is interfacing with an engagement plate of the camper body;
the roof left-side panel is oriented substantially horizontal and located above the roof back panel;
the roof right-side panel is oriented substantially horizontal and located above the roof left-side panel; and
the roof panel is oriented substantially horizontal and located above and covering the roof back panel, the roof left-side panel, and the roof right-side panel.

9. The pickup camper of claim 8, wherein in a deployed configuration:
the roof panel is rotated from the substantially horizontal position to an approximately 45-degree angle position;
the roof right-side panel is rotated from the substantially horizontal position to a substantially vertical position, the roof right-side panel interfacing with the roof panel;

the roof left-side panel is rotated from the substantially horizontal position to a substantially vertical position, the roof left-side panel interfacing with the roof panel; and the roof back panel is rotated from the substantially horizontal position to a substantially vertical position, the roof back panel interfacing with the roof panel, the roof right-side panel, and the roof left-side panel.

10. The pickup camper of claim 1, wherein the roof assembly further includes a compressible member located between an overhang of the rigid roof panel and a lip of the camper body front panel.

11. A pickup camper comprising:
a rigid left-side panel having an upper section rotatably coupled to a lower section, the upper section of the rigid left-side panel adapted to rotate from horizontal to substantially vertical;
a rigid right-side panel having an upper section rotatably coupled to a lower section, the upper section of the rigid right-side panel rotatably adapted to rotate from horizontal to substantially vertical;
a rigid back panel having an upper section rotatably coupled to a middle section, the upper section of the rigid back panel adapted to rotate from horizontal to substantially vertical; and
a rigid front panel having an upper section rotatably coupled to a lower section, the upper section of the rigid front panel adapted to rotate from horizontal to an angle of approximately 45 degrees;
wherein the rigid back panel includes a lower section rotatably coupled to the middle section, the lower section adapted to rotate from vertical to horizontal.

12. The pickup camper of claim 11, wherein (i) the upper section of the rigid left-side panel is removably coupled to the lower section of the rigid left-side panel; (ii) the upper section of the rigid right-side panel is removably coupled to the lower section of the rigid right-side panel; (iii) the upper section of the rigid back panel is removably coupled to the middle section of the rigid back panel; and (iv) the upper section of the rigid front panel is removably coupled to the lower section of the rigid front panel.

13. The pickup camper of claim 11, wherein in a travel configuration:
the upper section of the rigid left-side panel is oriented substantially horizontal;
the upper section of the rigid right-side panel is oriented substantially horizontal;
the upper section of the rigid back panel is oriented substantially horizontal; and
the upper section of the rigid front panel is oriented substantially horizontal and covering the upper sections of the rigid left-side panel, the rigid right-side panel, and the rigid back panel.

14. The pickup camper of claim 11, wherein in a deployed configuration:

the upper section of the rigid back panel is oriented in a substantially vertical position;
the upper section of the rigid left-side panel is oriented in a substantially vertical position;
the upper section of the rigid right-side panel is oriented at a substantially vertical position; and
the upper section of the rigid front panel is oriented at approximately a 45-degree angle from horizontal, the upper section of the rigid front panel interfacing with the rigid left-side panel, the rigid right-side panel, and the rigid back panel.

15. The pickup camper of claim 11, wherein (i) the upper section of the rigid left-side panel has a substantially triangular shape and the lower section of the rigid left-side panel has a substantially rectangular shape; and (ii) the upper section of the rigid right-side panel has a substantially triangular shape and the lower section of the rigid right-side panel has a substantially rectangular shape.

16. A pickup camper comprising:
a camper body including (i) a cross-member and (ii) a back panel removably and rotatably coupled to the cross-member; and
a roof assembly removably coupled to the camper body, the roof assembly including:
a rigid left-side panel rotatably and removably coupled to the camper body;
a rigid right-side panel rotatably and removably coupled to the camper body;
a rigid back panel rotatably and removably coupled to the cross-member of the camper body; and
a rigid roof panel removably and rotatably coupled to the camper body;
wherein (i) the roof panel is adapted to rotate from a substantially horizontal position to an approximately 45-degree angle position; (ii) the rigid right-side panel is adapted to rotate from a substantially horizontal position to a substantially vertical position and interfacing with the roof panel; (iii) the rigid left-side panel is adapted to rotate from a substantially horizontal position to a substantially vertical position and interface with the roof panel; (iv) and the rigid back panel is adapted to rotate from a substantially horizontal position to a substantially vertical position and interface with the rigid roof panel, the rigid right-side panel, and the rigid left-side panel.

17. The pickup camper of claim 16, wherein the camper body includes one or more protrusions to interface with the rigid back panel to keep the rigid back panel in a substantially horizontal orientation.

18. The pickup camper of claim 16, wherein the camper body can be disassembled into a plurality of panels.

19. The pickup camper of claim 16, wherein the rigid left-side panel, the rigid right-side panel, and the rigid back panel support the roof panel when the roof panel is oriented at the approximately 45-degree angle.

* * * * *